US008780765B2

(12) United States Patent
Lv (10) Patent No.: US 8,780,765 B2
(45) Date of Patent: Jul. 15, 2014

(54) METHOD, SYSTEM AND PEER APPARATUS FOR IMPLEMENTING MULTI-CHANNEL VOICE MIXING

(75) Inventor: Jing Lv, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 463 days.

(21) Appl. No.: 13/158,587

(22) Filed: Jun. 13, 2011

(65) Prior Publication Data

US 2011/0246191 A1 Oct. 6, 2011

Related U.S. Application Data

(63) Continuation of application No. PCT/CN2010/070021, filed on Jan. 5, 2010.

(30) Foreign Application Priority Data

Jan. 5, 2009 (CN) .......................... 2009 1 0000323

(51) Int. Cl.
*H04L 12/16* (2006.01)

(52) U.S. Cl.
USPC ......................................................... 370/260

(58) Field of Classification Search
None
See application file for complete search history.

(56) References Cited

U.S. PATENT DOCUMENTS

| 6,192,375 | B1 * | 2/2001 | Gross .................................. 1/1 |
| 6,192,395 | B1 * | 2/2001 | Lerner et al. .................. 709/204 |
| 6,226,673 | B1 | 5/2001 | Yoshimoto |
| 6,304,648 | B1 * | 10/2001 | Chang ...................... 379/202.01 |
| 6,501,739 | B1 * | 12/2002 | Cohen ........................... 370/260 |
| 7,720,978 | B2 * | 5/2010 | Zhu et al. ....................... 709/228 |
| 7,734,710 | B2 * | 6/2010 | Seligmann et al. ........... 709/207 |
| 7,831,270 | B2 * | 11/2010 | Kalley et al. .................. 455/518 |
| 7,835,364 | B2 * | 11/2010 | Baker et al. .............. 370/395.21 |
| 7,933,226 | B2 * | 4/2011 | Woodruff et al. ............. 370/260 |
| 2002/0103863 | A1 * | 8/2002 | Pearson ........................ 709/204 |

(Continued)

FOREIGN PATENT DOCUMENTS

| CN | 101047828 A | 10/2007 |
| CN | 101478619 A | 7/2009 |
| KR | 20050040977 A | 5/2005 |

OTHER PUBLICATIONS

International Search Report: mailed Apr. 15, 2010; Appln. PCT/CN2010/070021.

(Continued)

*Primary Examiner* — Warner Wong
(74) *Attorney, Agent, or Firm* — Harness, Dickey & Pierce, P.L.C.

(57) ABSTRACT

Embodiments of the present invention provide a method, system and peer apparatus for implementing multi-channel voice mixing, which belongs to a network communication field. The method includes: obtaining, by each peer, voice mixing quality parameters of super peers which are determined from peers according to information processing abilities of the peers; obtaining, by peers with voice input in the peers, priorities of the super peers according to the voice mixing quality parameters, and selecting at least one super peer for voice mixing from all the super peers according to the priorities of the super peers; mixing, by the at least one super peer for voice mixing, audio data of each peer with voice input; and publishing mixed data. The present invention selects a super peer to replace the existing server for implementing multi-channel voice mixing and publishing mixed data. Thus, server costs and bandwidth resources can be saved.

9 Claims, 3 Drawing Sheets

(56) References Cited

U.S. PATENT DOCUMENTS

| | | | |
|---|---|---|---|
| 2002/0156917 A1* | 10/2002 | Nye | 709/238 |
| 2004/0172255 A1* | 9/2004 | Aoki et al. | 704/275 |
| 2005/0213514 A1* | 9/2005 | Su et al. | 370/254 |
| 2005/0213734 A1* | 9/2005 | Rodman | 379/202.01 |
| 2008/0165785 A1* | 7/2008 | Baker et al. | 370/395.2 |
| 2009/0135740 A1* | 5/2009 | Dhara et al. | 370/260 |
| 2013/0204616 A1* | 8/2013 | Aoki et al. | 704/226 |

OTHER PUBLICATIONS

Fan Xing, et al; "Fast Real-Time Adaptive Audio Mixing Schemes in Multimedia Conferencing", Journal of *Software*, vol. 16, Issue 1, pp. 108-115; Jan. 2005.

First Chinese Office Action dated Sep. 14, 2010; Appln. No. 200910000323X.

\* cited by examiner

METHOD, SYSTEM AND PEER APPARATUS FOR IMPLEMENTING MULTI-CHANNEL VOICE MIXING

This is a continuation of International Application No. PCT/CN2010/070021 filed Jan. 5, 2010, which in turn claims the priority benefit of Chinese Patent Application No. 200910000323.X filed Jan. 5, 2009, the entire respective disclosures of which are incorporated herein by reference.

FIELD OF THE INVENTION

The present invention relates to a network communication field, and more particularly, to a method, system and peer apparatus for implementing multi-channel voice mixing.

BACKGROUND OF THE INVENTION

At present, with the development of online communities and large-scale online games on the interne, the demand for multi-person voice is kept rising. In the conventional method, the streaming media system based on the Peer to Peer (P2P) communication network system may implement multi-person interconnection. The P2P streaming media system may be classified into three types according to topology structure: a system with a single tree topology, a system with a multi-tree topology and a system with a network topology.

In the P2P streaming media data distribution system based on the single tree topology, the data stream is transmitted from a parent peer to a child peer of a distribution tree.

In the P2P streaming media data distribution system based on the multi-tree topology, the multi tree topology makes a same peer set in different distribution trees. In this way, when a distribution tree is failed temporally, the peer may still obtain data from other trees. In addition, a peer of a tree which needs not to forward data stream and locates at a position of a leaf peer may locate at a position of an intermediate peer of another tree which needs to forward data stream. Thus, compared with the single tree topology, peer load balance performance of the multi-tree topology is greatly improved. For example, a same peer may be a child peer of two multicast trees, or be an intermediate peer of another multicast tree other than the two trees at the same time.

In the P2P streaming media system based on the network topology, a peer may collectively select one or more peers from a cooperative peer set as its serving peers. Different from the multi-tree topology, the cooperative peer set is not fixed in the network topology, and is changed with joining in/exiting state of the peer, load, packet loss rate, and so on. Besides, peers do not observe a strict parent-child relationship, and one peer may send data to or receive data from a peer. The problem of network topology is how to select a peer and how to dispatch data.

In the conventional method, the multi-person interconnection is implemented with the multi-channel audio mixing technique, which is also called multi-channel voice synthesis technique. The technique is on the basis of a server-client architecture, i.e., S-C architecture. Each peer establishes a connection relationship with the server, and the server implements the multi-channel voice mixing and then performs the distribution. Generally, the voice mixing schemes all adopt time domain sample value sum as its basic processing method. Since there is a quantization upper limit and lower limit in the digital audio signal, stack operation will cause a result overflow. Regarding to the result overflow, an overflow detection is first performed, and then saturation operation is utilized, i.e. the result exceeding the upper limit is set as an upper limit value. The upper limit value depends on the number of bits of a voice coder. In the same way, the result less than the lower limit is set as a lower limit value. This operation destroys the original time domain characteristics of the audio signals, introduces noises, and results in a phenomenon of popping sounds and discontinuous voices in some systems. With the increase of persons participating in the voice mixing, the frequency of overflow also increases. Meanwhile, because there is an upper limit of this method, and generally speaking, the upper limit is very low. In general, there is a phenomenon that many noises and discontinuous voices are generated when four clients participate in the voice mixing, resulting in that the voice flow can't be differentiated. In order to solve the above problem, the multi-channel audio mixing technique adopts a weighting calculation method.

In the process for achieving the technical solutions of the present invention, the inventor discovers that the method for setting up a server to mix voices and perform multi-channel distribution needs many server costs.

SUMMARY OF THE INVENTION

In view of above, embodiments of the present invention provide a method, system and peer apparatus for implementing multi-channel voice mixing, the technical solutions are as follows:

The embodiments of the present invention provide a method for implementing multi-channel voice mixing, the method includes:

obtaining, by each peer, voice mixing quality parameters of super peers which are determined from peers according to information processing abilities of the peers;

obtaining, by peers with voice input in the peers, priorities of the super peers according to the voice mixing quality parameters, and selecting at least one super peer for voice mixing from all the super peers according to the priorities of the super peers;

mixing, by the at least one super peer for voice mixing, audio data of each peer with voice input; and publishing mixed data.

The embodiments of the present invention further provide a system for implementing multi-channel voice mixing, the system includes:

peers, configured to obtain voice mixing quality parameters of super peers;

peers with voice input, configured to obtain priorities of the super peers according to the voice mixing quality parameters, and select at least one super peer for voice mixing from all the super peers according to the priorities of the super peers;

the super peers, configured to mix audio data of the peers with voice input, and publish mixed data.

The embodiments of the present invention further provide a peer, the peer includes:

a first obtaining module, configured to obtain voice mixing quality parameters of super peers;

a second obtaining module, configured to obtain priorities of the super peers according to the voice mixing quality parameters;

a selecting module, configured to select a super peer for voice mixing from all the super peers according to the priorities of the super peers; and a voice module, configured to receive mixed data sent by the super peer for voice mixing, decode the mixed data, and play data obtained by the decoding.

The embodiments of the present invention further provide a super peer for implementing multi-channel voice mixing, the super peer includes:

a receiving module, configured to receive audio data of peers with voice input;

a mixing module, configured mix the audio data of the peers with voice input; and a publication module, configured to publish mixed data.

Advantages of technical solutions provided by embodiments of the present invention are as follows:

Each peer obtains voice mixing quality parameters of SPs, and obtains priorities of the SPs according to the voice mixing quality parameters of the SPs, and then selects at least one SP for voice mixing, instead of the server, encoding, and publishes mixed data based on the priorities, which can save the calculation costs, server costs and save bandwidth resources.

DETAILED DESCRIPTION OF THE INVENTION

In order to make objectives, technical solutions and advantages of the present invention more apparent, the present invention will be described in detail hereinafter with reference to accompanying drawings.

The First Embodiment

Figure 1:
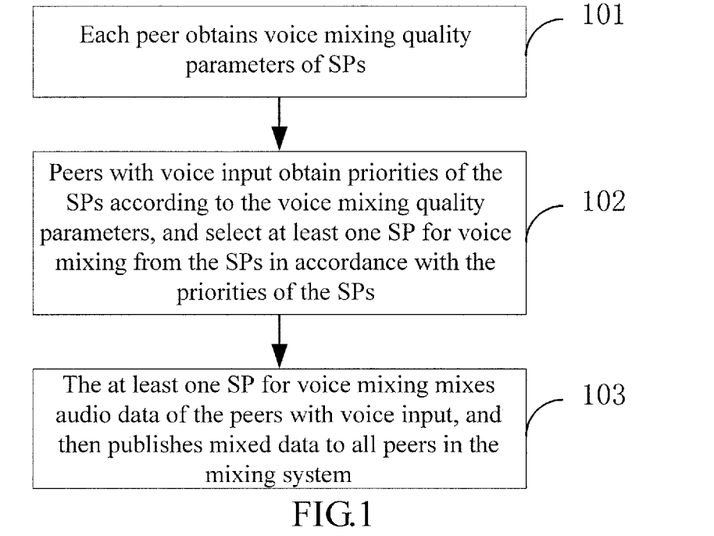
FIG. 1 is a flowchart illustrating a method for implementing multi-channel voice mixing according to a first embodiment of the present invention.

FIG. 1 is a flowchart illustrating a method for implementing multi-channel voice mixing according to the first embodiment of the present invention. As shown in FIG. 1, the method includes the following processes.

Block 101: Each peer obtains voice mixing quality parameters of super peers (SP)s.

Block 102: Peers with voice input obtain priorities of the SPs according to the voice mixing quality parameters, and select at least one SP for voice mixing from the SPs in accordance with the priorities of the SPs.

Block 103: The at least one SP for voice mixing mixes audio data of the peers with voice input, and then publishes mixed data to all peers in the mixing system.

In the embodiment, each peer obtains the voice mixing quality parameters of the SPs, and obtains the priorities of the SPs according to the voice mixing quality parameters of the SPs, and then selects at least one SP for voice mixing according to the priorities, which performs voice mixing, encoding, and publication of mixed data instead of a server. Thus, the computation and costs of the server can be saved, and the bandwidth resources are also saved.

The Second Embodiment

Figure 2:
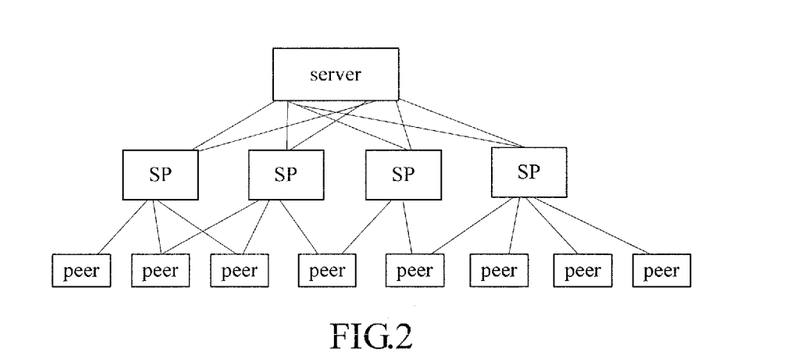
FIG. 2 is a schematic diagram illustrating structure of multi-tree topology a of P2P network system according to a second embodiment of the present invention.

Refer to FIG. 2, which is a schematic diagram illustrating the multi-tree topology of the P2P network system according to the second embodiment of the present invention. As shown in FIG. 2, the multi-tree topology includes a login server, a proxy server, SPs and peers. All SPs and peers need to log on the login server and the proxy server. The login server and the proxy server respectively implement different logical functions. In physical implementation, the two servers may be deployed in a same host according to the number of users. Hereinafter, the login server and proxy server are referred as the server.

Specifically, the login server is a portal of the whole P2P network system and is used for authenticating users and obtaining user parameters. The proxy server is configured to obtain peers with resources saved, and manage the peers, for example, select a SP from peers. All tasks except for the identity authentication of a user for logging implemented by a server are implemented by the proxy server.

The SPs are predetermined from the peers according to information processing abilities of the peers. In specific, the SP is the same as a peer in physical implementation, and the difference between the SP and the peer is that the SP possesses an independent public internet protocol (IP). The public IP is as follows: for a local area network, multiple peers communicate with the outer network with a common IP address which is a public IP address; for outer network routing, an IP address which can be directly accessed by the outer network route is a public IP address. The P2P system selects a peer possessing independent public IP as the SP. Besides, different P2P systems may select a SP from peers based on different conditions, for example, select a peer with more bandwidths as the SP. The SP serves as a transfer peer of voice data and manages the peers. Each P2P system may select a SP according to other conditions except for the public IP. For example, a speed for connecting to a server, hardwire level, etc. may be taken as factors for selecting the SP.

A working scene of the P2P network system provided by the embodiment is as follows: it is supposed that peers participating in a multi-person session are $P_1, P_2 \ldots P_N$ ($3<=N<=MAX\_NUM$). The MAX_NUM may be dynamically set according to system performances and network states, N is the number of persons participating in the multi-person session, and $P_1, P_2 \ldots P_N$ may be the peers shown in FIG. 2, or may also be the SPs shown in FIG. 2. In general, it is difficult to distinguish what the users say when more than six users talk all at the same time in real life, so the number "Na" of persons who talk at the same time is set to $Na<=6$ in the multi-person voice system. Generally, an active voice detecting unit is set according to sensitivity that a person responds to a voice, for example, usually less than 3 seconds. During each active voice detecting unit, the current Na participators with voice input are found out from all persons participating in the multi-person session. Where, the participators may be found with a Voice Active Detection (VAD) method. The VAD method which is a common algorithm used in the audio communication system includes: detecting active voices according to energy properties of low frequency (i.e. the frequency domain of human vocal cords ranges from 500 Hz to 3400 Hz). When there are voices input, the energy rises rapidly at the beginning, while the frequency of impulsive noises changes little, the action time of the time domain is short, and the Gaussian noises can be more easily distinguished with spectrum characteristics.

Based on the structure of the P2P network system shown in FIG. 2 and the working scene of the P2P network system described above, the method for implementing the multi-channel voice mixing provided by the embodiment includes the following contents.

Figure 3:
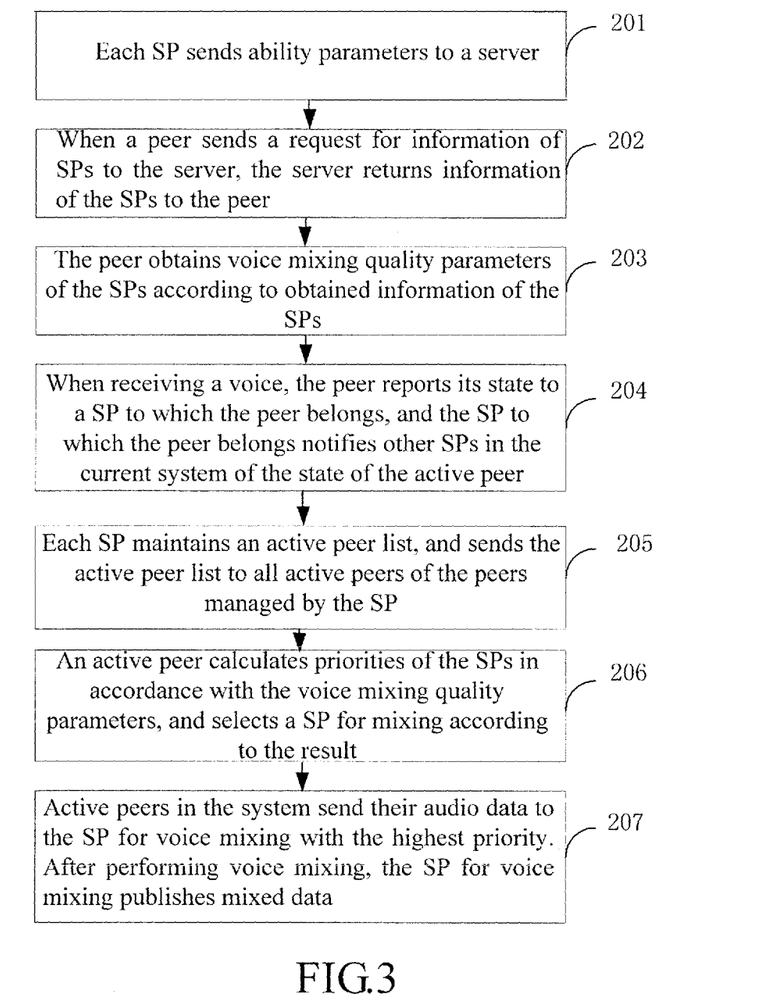
FIG. 3 is a flowchart illustrating a method for implementing multi-channel voice mixing according to a second embodiment of the present invention.

It is supposed that peers currently participating in the multi-person session are $P_1, P_2 \ldots P_N$ ($3<=N<=MAX\_NUM$), among which, active peers (i.e. peers with voice input) are $PA_1, PA_2, \ldots PA_{Na}$. The super peers in the current P2P system are $SP_1, SP_2 \ldots SP_M$. As shown in FIG. 3, FIG. 3 is a flowchart illustrating a method for implementing multi-channel voice mixing according to this embodiment of the present invention, the method includes:

Block 201: Each SP sends ability parameters to a server.

When a peer logs on the system, each of SPs reports an ability parameter table to the server used for determining voice mixing processing abilities of the SPs by the server. The ability parameter table of each SP is shown in table 1:

TABLE 1

| HL | Hardware Level |
|---|---|
| CB | Capable Bandwidth |
| SPID | Service Provider ID |
| TL | Time Left |

The ability parameter table includes the HL, CB, SPID and the TL.

The HL: The voice mixing needs to occupy hardware resources of the user. Other task processes of the user should not be affected by the increase of the CPU usage of the SP due to the voice mixing. Thus, the hardware level affects the maximum number of peers which can be processed by the SP.

The CB represents uplink/downlink bandwidths of a SP, and indicates data throughput of the SP.

The SPID represents the ID of a service provider to which the SP belongs. Different service providers have different SPIDs. Because there is a bottleneck in the cross-network interconnection between service providers, in the process of implementing the embodiment of the present invention, the SPID is taken as a parameter for determining whether the current active peer (PA) and selected SP for voice mixing belong to the same service provider.

The TL predicts a time left of the SP. A stable SP contributes to the provision of stable service qualities. Each SP predicts a time left upon logging on in accordance with accumulative online time, average everyday online time, and main online time periods. The unit of the time left is minute, for instance, TL 120 min indicates that the SP may log out after 120 minutes.

Block 202: When a peer sends a request for information of SPs to the server, the server returns information of the SPs to the peer. Information of each SP includes a matching value which a matching value of the peer and the SP.

The ability parameter table of each SP in the current P2P system is stored in the server, and is updated at regular intervals. The interval may be configured in accordance with different functions of the system. The current P2P system refers to the one currently participating in the multi-person session.

Specifically, in the peers $P_1, P_2 \ldots P_N$ currently participating in the multi-person session, each of the peers needs the SPs to perform the voice mixing. Before this, the peer needs to send a request to the server, obtains the information of the SPs through the request, and selects a SP for voice mixing for itself. When one of the peers $P_1, P_2 \ldots P_N$ sends a request for information of the SPs to the server, the server returns information of the SPs to the peer. The information of each SP includes ability parameters of the SP, IP, network connection ports of the SP, and so on. The information further includes a matching value M which is a matching value of the peer and the SP, for instance, $M_{SPi-Pj}$ denotes a matching value of peer Pj and super peer SPi. The calculation method is as follows:

$$M_{SPi-Pj} = W_1 * HL_{SPi} + W_2 * CB_{SPi} + W_3 * TL_{SPi} - W_4 * |SPID_{SPi} - SPID_{Pj}|$$ (formula 1)

$M_{SPi-Pj}$, denotes a matching value of peer Pj and super peer SPi, $HL_{SPi}$, denotes a hardware level of the super peer SPi, $CB_{SPi}$, denotes a capable bandwidth of the super peer SPi, $TL_{SPi}$, denotes a time left of the super peer SPi, $|SPID_{SPi} - SPID_{Pj}|$ denotes a absolute value of a difference value between the SPID of SPi and the SPID of the peer Pj, W1, W2, W3, W4 are corresponding weights, which range from 1 to 10. The weight values may be determined according to actual requirements and experiment results. For instance, it is wished affect other task processes by the increase of the CUP usage caused by the voice mixing processing. Thus, a relatively large value may be given to the weight W1 of $HL_{SPi}$.

Block 203: The peer obtains voice mixing quality parameters of the SPs according to obtained information of the SPs.

Taking peer Pj for an example, the voice mixing quality parameter $Q_{SPi-Pj}$ (which is called Q value for short) of the SPi may be directly obtained according to the ability parameters of the super peer, for instance, make $Q_{SPi-Pj} = M_{SPi-Pj}$. Alternatively, a delay between the peer and the SP may be taken into consideration on the basis of the ability parameters of the SP.

Specifically, when the multi-person session P2P system is established, each of the peers P1, P2 . . . PN of the system obtains information of all SPs of the current multi-person session, and store the information in a local controlling module of the peer. Meanwhile, the peer needs to test the delay between itself and each SP, i.e. $D_{SPi-Pj}$. The less the delay is, the better the connection between the Pj and the SPi is. For the peer Pj, the voice mixing quality parameter $Q_{SPi-Pj}$ of the SPi may be obtained via the following formula:

$$Q_{SPi-Pj} = M_{SPi-Pj} - D_{SPi-Pj}$$ (formula 2)

When sorting all SPs of the current multi-person session system according Q values, the larger the Q value is, the higher the priority of the corresponding SP is. Generally, SPs whose priorities are in the top preset number are selected as the SPs for voice mixing.

When a SP is offline, the server informs the peer to delete the information of the SP. The peer initiatively obtain updated contents from the server at regular intervals (the interval may be set). The updated contents include: online time of a SP, a SP that newly logs on, and so on. When a SP logs on the system, the server predicts online time of the SP according to usual behavior characteristics of the SP, such as online time. After the SP is being online for a time period t, the online time t is subtracted from the online time accordingly, and after the SP logouts, the online time of the SP is reset to zero.

Block 204: When receiving a voice, the peer reports its state to a SP to which the peer belongs, and the SP to which the peer belongs notifies other SPs in the current system of the state of the active peer.

When a peer in the multi-person session P2P system detects the input of a voice, the peer takes itself as an active peer. In the embodiment, an active peer is denoted with PA and the peer reports a state that it is an active peer to a SP to which the peer belongs. The SP to which the peer belongs notifies the other SPs in the current system, so that each SP can know which peers with voice input in the current system.

Block 205: Each SP maintains an active peer list, and sends the active peer list to all active peers of the peers managed by the SP.

Each SP maintains an active peer list means that each SP in the current system stores an active peer list. Meanwhile, each SP updates the stored active peer list. The active peer list reflects the peers with voiced input in the current system, i.e., active peers. The SP sends the active peer list maintained by itself to all active peers of the peers managed by the SP, so that all active peers may obtain the current active peer list.

Functions of blocks 204~205 lie in that the SPs and the active peers may work cooperatively, and the resources of the server can be saved.

In above mentioned blocks 204~205, it should be noted that, after a peer logs on the current multi-person session P2P system, a server returns information of all SPs in the current system to the peer, and the peer selects one or more SPs as the one to which the peer belongs. These characteristics are possessed by the existing P2P system when being constructed. A peer may log on a SP which can establish a connection with the peer with a fastest speed, and the SP is the one that the peer belongs to. The relationship between one peer and its SP is not a one-to-one relationship, i.e. one peer may correspond to several SPs to which the peer belongs, and each SP may manage several peers.

Block 206: An active peer calculates priorities of the SPs in accordance with the voice mixing quality parameters, and selects a SP for mixing according to the result.

An example will be given hereinafter to describe the process that the active peer calculates the priorities of the SPs on the basis of the voice mixing quality parameters, and selects a SP for voice mixing according to the result by the active peer.

It is supposed that currently there are three active peers, i.e. PA1, PA2 and PA3, and five super peers, i.e. SP1, SP2, SP3, SP4 and SP5. Each active peer obtains voice mixing quality parameters Qs of all SPs in the system according to the method in block 203 of the embodiment, and sorts the five SPs of the current multi-person session system according to the values of Qs. The larger the Q value, the higher the priority of the corresponding SP. Each active peer may obtain a priority list about the SPs. Referring to table 2, table 2 is a priority list of SPs obtained by the current active peer.

TABLE 2

| Description | Sorting number of SPs | | | | |
| --- | --- | --- | --- | --- | --- |
|  | 1 | 2 | 3 | 4 | 5 |
| SP priority list of $PA_1$ | $SP_2$ | $SP_3$ | $SP_1$ | $SP_4$ | $SP_5$ |
| SP priority list of $PA_2$ | $SP_4$ | $SP_3$ | $SP_2$ | $SP_5$ | $SP_1$ |
| SP priority list of $PA_3$ | $SP_1$ | $SP_2$ | $SP_3$ | $SP_4$ | $SP_5$ |

The active peer calculates the priority of each SP according to above table, as shown in table 2:

The priority of $SP_2$ is 1+3+2=6.

1 is the sorting number of $SP_2$ in the SP priority list of $PA_1$, and similarly, 3 is the sorting number of $SP_2$ in the SP priority list of $PA_2$, 2 is the sorting number of $SP_2$ in the SP priority list of $PA_3$, and 6 is the calculated priority of $SP_2$.

The priority of $SP_3$ is 2+2+3=7.

The meaning of each value is the same as that of $SP_2$, and no further descriptions are repeated here.

The priority of each SP is obtained according to above-mentioned calculation processes: the priority of $SP_1$ is 9, the priority of $SP_4$ is 9, and the priority of $SP_5$ is 14.

It can be seen from above-mentioned calculated result that $SP_2$ has the highest priority, so $SP_2$ is firstly selected as the SP for voice mixing, and $SP_3$ is selected as a standby SP for voice mixing.

In above-mentioned process, since there is mechanism for notifying each other among the active peers, priority calculation of the SP for voice mixing and selection of the SP for voice mixing may be accomplished by one peer of the multiple peers. For instance, it is prescribed that the calculation starts from an active peer with the smallest Unique Identification Number (UIN) which can be interpreted as the account of the user. After finishing the selection the SP for voice mixing, the active peer notifies other active peers. The UIN is a user account of the active peer. For example, $PA_2$ in the active peers has the smallest UIN in the current multi-person session P2P system, so it may be prescribed that $PA_2$ selects the SP for voice mixing. After determining the SP for voice mixing, $PA_2$ notifies $PA_1$ and $PA_3$.

Block 207: Active peers in the system send their audio data to the SP for voice mixing with the highest priority. After performing voice mixing, the SP for voice mixing publishes mixed data.

According to the example in block 206, the peers $PA_1$, $PA_2$ and $PA_3$ with voice input send their own audio data to $SP_2$. After performing voice mixing, $SP_2$, as a publication source, publishes the mixed data in the system.

An active peer receives audio data, which includes audio data of the active peer, mixed by the SP, for example, $PA_1$ of the above-mentioned active peers receives the mixed audio data, which includes audio data of $PA_1$. In practical application, it is a bad experience for a user to hear echo of his voices. In order to avoid the echo, it is required to perform echo cancellation (EC). EC refers to cancelling echo in the network by using a hardwire method or software method. In the embodiment of the present invention, the software method is utilized for EC, i.e., the echo is cancelled through an EC filter.

It should be noted that, the above-mentioned active peers can perform collection, playing, encoding and VAD function on audio signals, which are existing techniques, so no further descriptions are repeated herein. Besides functions of a peer, a SP is also able to manage peers logged on, achieve information exchange among peers, receive audio data of active peers, implement voice mixing and publish mixed data.

The above example is described by taking three active peers for an instance, when there is only one active peer PA in the system, audio data of the peer is directly mixed by a SP with the highest priority and published by the SP after being mixed. The processing method of two active peers is similar to that of the three active peers, and no further descriptions are repeated here.

The numbers in the embodiment are only used for quotation, not for limiting the sequence of the flows.

The method for implementing multi-channel voice mixing in the embodiment is described by taking the number of active peers in the system less than or equal to three for example. In the method, after all peers have logged on a server, the server obtains ability parameters of the SPs from the reporting of the SPs. When each peer sends a request for information of SPs to the server, the server returns information of the SPs to the peer, and information of each SP includes a matching value of the peer and the SP. The peer may obtain voice mixing quality parameters of the SPs according to information of the SPs, obtain priorities of the SPs in accordance with the voice mixing quality parameters of the SPs, and select a SP for voice mixing based on the priorities. In whole working processing, there is a mechanism of notifying each other among peers, SPs and peers, which achieves cooperative work among multiple peers. In the method for implementing multi-channel voice mixing in embodiments of the present invention, several SPs, instead of a server, performs the voice mixing, encoding, publication of mixed data, which reduces the calculation processes performed by the server, reduces the cost of the server and saves bandwidth resources.

The Third Embodiment

In the multi-person session P2P system provided by the embodiment, it is supposed that the number of peers with voice input is larger than or equal to 3 and less than or equal to 6 (in view of the actual conditions that, it is difficult to distinguish what the six persons say when more than six persons talk all at the same time in real life), active peers are divided into two groups for voice mixing. The cooperative work among peers in the dividing process may improve the efficiency of the system.

For example, peers currently participating in the multi-person session in the P2P system are $PA_1$, $PA_2$, $PA_3$, $PA_4$, $PA_5$. The dividing process are as follows:

Compare a preferred SP of $PA_1$ with preferred SPs of $PA_2 \sim PA_5$. If the preferred SP of PAx of $PA_2 \sim PA_5$ is the same as that of $PA_1$, PAx and $PA_1$ will be grouped into one group. If there are more than two active peers whose preferred SPs are the same as that of $PA_1$, two active peers are randomly selected to form a group with $PA_1$, the remaining peers form the other group. If there is no active peer whose preferred SP is the same as that of $PA_1$, a preferred SP of $PA_2$ is compared with a preferred SP of PAx of $PA_3 \sim PA_5$, and the rest may be deduced by analogy.

If the preferred SPs of all peers are all different, the preferred SP of $PA_1$ is compared with secondary SPs of $PA_2 \sim PA_5$, the rest processing is similar to the above-mentioned processing.

In order to enhance efficiency, if the searching carried out with the secondary SPs fails, the active peers will be randomly grouped instead of using other algorithms, since there are no evident differences between the effect of grouping by using other algorithms and the effect of random grouping when the number of peers is limited.

In the embodiment, after all active peers are divided into groups, each group respectively performs processing according to the method in the second embodiment, and no further descriptions are repeated herein. Each peer in the system receives two groups of mixed data, and synthesizes the data when it is played at local. To save the bandwidths of the system, the two groups of mixed data may also be mixed to one group. Due to the time domain sensitivity of the voice data, if the voices are mixed for another time, delay is introduced and user experiences are reduced. Thus, a better method is that after receiving two groups of mixed data, each peer synthesizes the data at local when playing the data.

The Fourth Embodiment

Figure 4:
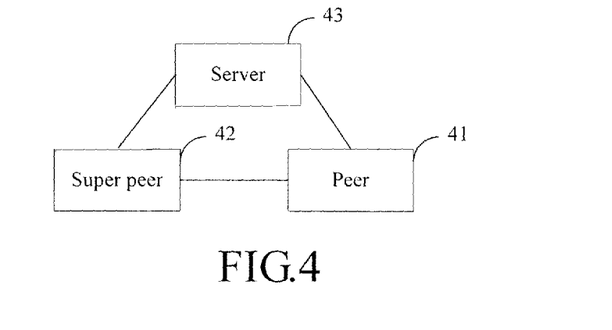
FIG. 4 is a schematic diagram illustrating structure of a system for implementing multi-channel voice mixing according to a fourth embodiment of the present invention.

As shown in FIG. 4, the embodiment provides a system for implementing multi-channel voice mixing. In the system, a SP is used instead of a server, multiple peers work cooperatively for implementing the multi-channel voice mixing. The system includes peer 41 and SP 42.

Each peer 41 is configured to obtain a voice mixing quality parameter of each SP 42. Each peer with voice input obtains a priority of each SP 42 according to corresponding voice mixing quality parameter, and select a SP for voice mixing from the SP 42 in accordance with the priority of each SP 42.

Each SP 42 is configured to mix audio data of peers with voice input, and publish the mixed data to each peer 41.

The system further includes: a server 43, configured to receive ability parameters reported by each super peer 42, and return information of each super peer 42 to a peer 41 when the peer 41 sends a request for information of each SP 42 to the server. The information of each SP includes a matching value of the peer 41 and the SP 42.

In the embodiment, the server 43 is further configured to perform login management on each peer 41 and each SP 42.

The server 43 maintains the voice mixing quality parameter of each super peer 42, in which, the maintenance means storage and timely update.

In the P2P system of the embodiment, the super peer 42 implements the voice mixing, encoding, and publication of mixed audio data instead of the server. That is, the multi-person session is implemented with the resources of the P2P system, and the computation of the server and bandwidth resources are saved.

The Fifth Embodiment

Figure 5:
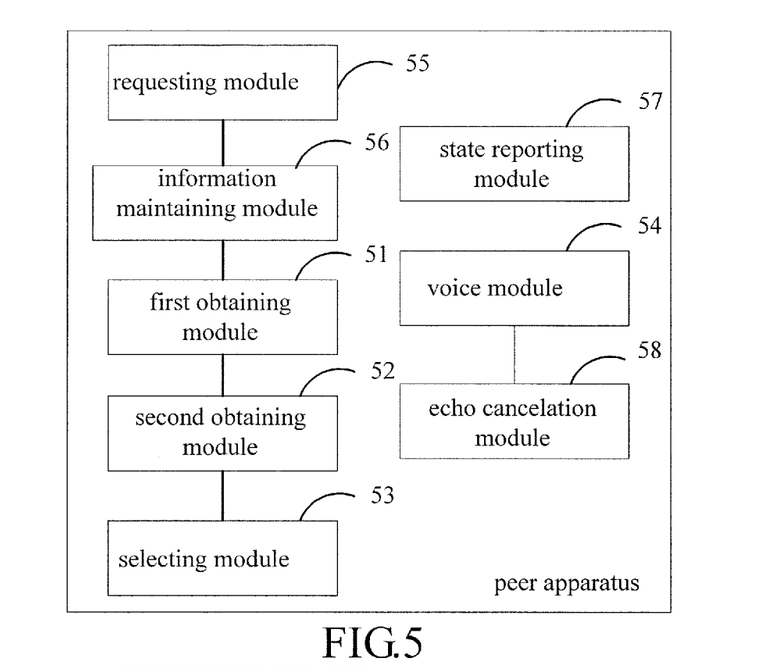
FIG. 5 is a schematic diagram illustrating structure of a peer apparatus according to a fifth embodiment of the present invention.

As shown in FIG. 5, the embodiment provides a peer apparatus, and the peer apparatus includes the following modules.

A first obtaining module 51 is configured to obtain a voice mixing quality parameter of each SP.

A second obtaining module 52 is configured to obtain a priority of each super peer according to the voice mixing quality parameter.

A selecting module 53 is configured to select a SP for voice mixing from all super peers according to priorities of the SPs.

A voice module 54 is configured to receive mixed data sent by the SP for voice mixing.

The voice module 54 may also collect local voice data, encode the collected voice data and send the encoded data to the SP for voice mixing.

Perfectly, the peer apparatus may further include:

a requesting module 55, configured to send a request for information of each SP to each server; and an information maintaining module 56, configured to store information of each SP returned by the server. The information includes a matching value of the peer and the SP.

The first obtaining module 51 obtains voice mixing quality parameters of super peers according to information of the super peers stored by the information maintaining module 56.

The peer apparatus may further include:

a state reporting module 57, configured to report the state of a peer with voice input to the SP to which the peer belongs; and an echo cancellation module 58, configured to filter out local audio data from received mixed audio data.

The peer apparatus provided by the embodiment obtains voice mixing quality parameters of the SPs, obtains priorities of the SPs according to the voice mixing quality parameters, and selects a SP for voice mixing from the SPs for voice mixing and publication of mixed audio data. The multi-person session is implemented through the multi-peer cooperative work of the P2P system, and the server resources are saved.

The Sixth Embodiment

Figure 6:
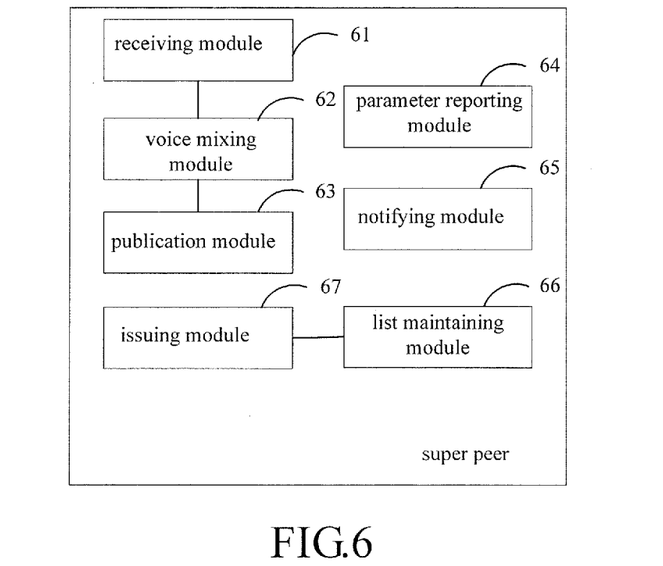
FIG. 6 is a schematic diagram illustrating structure of a super peer according to a sixth embodiment of the present invention.

As shown in FIG. 6, the embodiment provides a SP for implementing multi-channel voice mixing. The SP includes:

a receiving module 61, configured to receive audio data of peers with voice input;

a voice mixing module 62, configured to perform voice mixing on the audio data of the peers with voice input;

a publication module 63, configured to publish mixed data to peers.

To reduce bandwidth occupancy, the voice mixing module 62 encodes the mixed data, and the publication module 63 publishes encoded mixed data to the peers. The mixing module 62 may encode the mixed data by utilizing an existing voice encoding method.

Optimally, the SP may further include:

a parameter reporting module 64, configured to report ability parameters to the server;

a notifying module 65, configured to notify other SPs in the current system of states of the peers with voice input;

a list maintaining module 66, configured to store a list of peers with voice input, which updated in time by the SP; and an issuing module 67, configured to issue the list to peers with voice input of peers managed by the SP.

The SPs provided by the embodiment may manage ordinary peers in the system, can implement multi-channel audio data mixing through the cooperative work of multiple peers, and publish mixed audio data. The SPs in P2P system may exchange information through a notification mechanism, and then achieve the cooperative work of multiple peers.

The persons having ordinary skill in the art may understand that the accompanying drawings are only schematic diagrams of a preferred embodiment. Modules or blocks in the drawings are not always required for implementing the present invention.

The persons having ordinary skill in the art may understand that modules in apparatuses of the embodiments may be distributed in the apparatuses according to descriptions of the embodiments, or be configured in one or more apparatuses different from those in the embodiments after making some changes. The modules in the above-mentioned embodiments may be merged into one module, or be further divided into several sub-modules.

The numbers in the embodiments of the present invention are only used for description, but not used for judging the embodiments.

The foregoing description is only preferred embodiments of the present invention and is not used for limiting the protection scope thereof. Any modification, equivalent substitution, or improvement made without departing from the spirit and principle of the present invention should be covered by the protection scope of the present invention.

The invention claimed is:

1. A method for implementing multi-channel voice mixing, comprising: reporting, by super peers, ability parameters to a server;

obtaining, by each peer, voice mixing quality parameters of the super peers which are determined from peers according to information processing abilities of the peers;

obtaining, by peers with voice input in the peers, priorities of the super peers according to the voice mixing quality parameters, and selecting at least one super peer for voice mixing from all the super peers according to the priorities of the super peers;

mixing, by the at least one super peer for voice mixing, audio data of each peer with voice input; and publishing mixed data; wherein obtaining by each peer the voice mixing quality parameters of the super peers comprises:

obtaining, by each peer, the voice mixing quality parameters of the super peers according to the ability parameters of the super peers stored by the server.

2. The method according to claim 1, wherein the ability parameters comprise: a Hardware Level (HL), a Capable Bandwidth (CB), a Service Provider Identity (SPID), and/or Time Left (TL).

3. The method according to claim 1, further comprising:

detecting, by each peer, a delay of each super peer; wherein the voice mixing quality parameter of each super peer is obtained with $M_{SPi-Pj} = W_1{}^*HL_{SPi} + W_2{}^*CB_{SPi} + W_3{}^*TL_{SPi} - W_4{}^*|SPID_{SPi} - SPID_{Pj}|$ and $Q_{SPi-Pj} = M_{SPi-Pj} - D_{SPi-Pj}$;

$M_{SPi-Pj}$ denotes a matching value of a peer Pj and a super peer SPi; $HL_{SPi}$ denotes HL of the super peer SPi; $CB_{SPi}$ denotes a CB of the super peer SPi; $TL_{SPi}$ denotes TL of the super peer SPi; $|SPID_{SPi} - SPID_{Pj}|$ denotes a absolute value of a difference value between SPID of the super peer SPi and that of the peer Pj; W1, W2, W3, W4 are corresponding weights; $D_{SPi-Pj}$ denotes a delay needed by the peer Pj for connecting to the super peer SPi; and $Q_{SPi-Pj}$ denotes a voice mixing quality parameter of the super peer SPi.

4. The method according to claim 2, wherein obtaining by the peers with voice input priorities of the super peers according to the voice mixing quality parameters, and selecting at least one super peer for voice mixing from all the super peers according to the priorities of the super peers comprises:

sorting all the super peers according to values of the voice mixing quality parameters of the super peers;

obtaining the priorities of the super peers according to a result obtained by the sorting; and selecting at least one super peer whose priority is in the top preset number as the at least one super peer for voice mixing.

5. The method according to claim 1, further comprising:

reporting, by each peer with voice input, state of the peer to a super peer to which the peer belongs;

notifying, by the super peer, the other super peers in a voice mixing system of the state of each peer with voice input;

storing, by the super peer, a list of the peers with voice input, which is updated by the super peer;

sending, by the super peer, the list to the peers with voice input of peers managed by the super peer.

6. The method according to claim 1, further comprising:

dividing the peers with voice input into at least two groups;

mixing, by a super peer for voice mixing of each group, audio data of peers of the group;

receiving mixed data obtained by each super peer for voice mixing; and synthesizing the mixed data when playing.

7. A system for implementing multi-channel voice mixing, comprising:

peers, configured to obtain voice mixing quality parameters of super peers;

peers with voice input in the peers, configured to obtain priorities of the super peers according to the voice mixing quality parameters, and select at least one super peer for voice mixing from all the super peers according to the priorities of the super peers;

the super peers, configured to mix audio data of the peers with voice input, and publish mixed data; and a server, configured to receive ability parameters reported by the super peers, and return a matching value between a peer and each of the super peers obtained according to the ability parameters of the super peers to the peer when the peer sends a request for information of the super peers to the server.

8. A peer, comprising:

a first obtaining module, configured to obtain voice mixing quality parameters of super peers;

a second obtaining module, configured to obtain priorities of the super peers according to the voice mixing quality parameters;

a selecting module, configured to select a super peer for voice mixing from all the super peers according to the priorities of the super peers; and a requesting module, configured to send a request for information of the super peers to a server, an information maintaining module, configured to store information of the super peers returned by the server, the information comprising a matching value of the peer and each of the super peers; wherein the first obtaining module is further configured to obtain the voice mixing quality parameters of the super peers according to the matching value and a delay between a peer with voice input and the super peer.

9. A super peer for implementing multi-channel voice mixing, comprising:
- a received module, configured to receive audio data of peers with voice input;
- a mixing module, configured mix the audio data of the peers with voice input; and
- a publication module, configured to publish mixed data;
- a parameter reporting module, configured to report ability parameters to the server;
- a notifying module, configured to notify the other super peers in a mixing system of states of the peers with voice input;
- a list maintaining module, configured to store a list of the peers with voice input, which is updated timely by the super peer; and
- an issuing module, configured to send the list to the peers with voice input among peers managed by the super peer.

* * * * *